United States Patent
Iuchi et al.

(10) Patent No.: US 10,544,320 B2
(45) Date of Patent: Jan. 28, 2020

(54) INK COMPOSITION, INKJET RECORDING METHOD, AND COLORED ARTICLE

(71) Applicant: Nippon Kayaku Kabushiki Kaisha, Tokyo (JP)

(72) Inventors: Maiko Iuchi, Tokyo (JP); Akira Kawaguchi, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/323,026

(22) PCT Filed: Jul. 16, 2015

(86) PCT No.: PCT/JP2015/070461
§ 371 (c)(1),
(2) Date: Dec. 29, 2016

(87) PCT Pub. No.: WO2016/010129
PCT Pub. Date: Jan. 21, 2016

(65) Prior Publication Data
US 2017/0137652 A1    May 18, 2017

(30) Foreign Application Priority Data

Jul. 18, 2014 (JP) ................. 2014-147264

(51) Int. Cl.
  *C09D 11/38* (2014.01)
  *B41J 2/01* (2006.01)
  *B41M 5/50* (2006.01)

(52) U.S. Cl.
  CPC ................ *C09D 11/38* (2013.01); *B41J 2/01* (2013.01); *B41M 5/50* (2013.01)

(58) Field of Classification Search
  CPC .................................................. C09D 11/30
  See application file for complete search history.

(56) References Cited

U.S. PATENT DOCUMENTS

| | | | | |
|---|---|---|---|---|
| 4,070,322 | A * | 1/1978 | Hwang | C09D 11/36 106/31.49 |
| 2002/0169232 | A1* | 11/2002 | Yatake | C07H 15/08 523/160 |
| 2004/0122131 | A1* | 6/2004 | Brown | C09D 11/30 523/160 |
| 2008/0182929 | A1 | 7/2008 | Strepka et al. | |
| 2010/0093900 | A1 | 4/2010 | Ohya et al. | |
| 2014/0287198 | A1 | 9/2014 | Okuyama | |

FOREIGN PATENT DOCUMENTS

| | | |
|---|---|---|
| CN | 104057743 A | 9/2014 |
| JP | S61-057669 | 3/1986 |
| JP | S61-168677 | 7/1986 |
| JP | 2003-253167 | 9/2003 |
| JP | 2004-115589 | 4/2004 |
| JP | 2006-182943 | 7/2006 |
| JP | 2012-167227 A | 9/2012 |
| JP | 2013-142150 | 7/2013 |
| WO | WO 2008/105289 | 9/2008 |
| WO | WO 2012/024472 A1 | 2/2012 |

OTHER PUBLICATIONS

Datasheet on Texanol by Pubchem (obtained Dec. 22, 2017).*
Extended European search report in European Patent Application No. 15822735.5 dated Apr. 12, 2017.
Notification of Reasons of Refusal issued in Japanese Patent Application No. JP2016-534497 dated Mar. 5, 2019.
Office Action issued in Chinese Patent Application No. 201580036711.7 dated Oct. 8, 2019.

* cited by examiner

*Primary Examiner* — Scott R. Walshon
*Assistant Examiner* — Sathavaram I Reddy
(74) *Attorney, Agent, or Firm* — Knobbe, Martens, Olson & Bear, LLP

(57) ABSTRACT

An ink composition that offers a recorded image having rubfastness and having high quality without causing a mottling phenomenon, an inkjet recording method using the same, and a colored article. The ink composition includes a compound represented by the following formula (1):

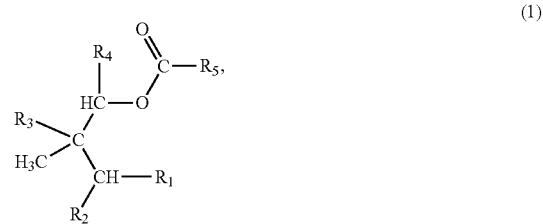

(1)

a colorant, a dispersant, and a C4-C12 alkanediol, in which the content of the compound represented by formula (1) is 0.1 to 5% by mass. In the formula (1), $R_1$ represents a hydroxy group or the like, $R_2$ represents an alkyl group or the like, $R_3$ represents an alkyl group or the like, $R_4$ represents a hydrogen atom or the like, and $R_5$ represents an alkyl group.

10 Claims, No Drawings

INK COMPOSITION, INKJET RECORDING METHOD, AND COLORED ARTICLE

CROSS-REFERENCE TO RELATED APPLICATIONS

This application is the U.S. National Phase under 35 U.S.C. § 371 of International Application PCT/JP2015/070461, filed Jul. 16, 2015, which was published in Japanese as WO 2016/010129 on Jan. 21, 2016, which claims priority to Japanese Patent Application No. 2014-147264, filed Jul. 18, 2014, the entire contents of which are incorporated herein by reference.

TECHNICAL FIELD

The present invention relates to an ink composition, an inkjet recording method using the ink composition, and a colored article obtained by coloring with the ink composition.

BACKGROUND ART

Among various color recording methods, a recording method using an inkjet printer as a typical method performs recording by generating small droplets of ink and attaching the droplets to a recording material such as paper. The advance of inkjet technology has also increased use of the inkjet recording method in the field of high-resolution printing, which previously had been achieved by silver halide photography or offset printing. In recent years, there has been a further growing demand for this method for industrial purposes, and high-speed printing performance has also been desired.

Recording media having an ink-absorbing layer, such as inkjet exclusive paper and gloss paper for inkjet, as well as recording media having low ability to absorb ink; i.e., having no ink-absorbing layer, such as general-purpose plain paper, are used in inkjet recording methods using aqueous ink. Since the latter recording media are less permeable to ink, printed matter has weak rubfastness. Particularly, a phenomenon called mottling may occur when an aqueous pigment ink is used.

Mottling refers to the phenomenon in which, for example, when an image with a large amount of ink attached, such as a solid image, is recorded, the amount of ink attached exceeds the capacity of a recording material to absorb ink, whereby the ink fails to be uniformly absorbed to the recording material so that droplets of unabsorbed ink are maldistributed and fixed on the recording material, causing irregular image unevenness.

In response to the problems described above, Patent Documents 1 and 2 disclose ink that reportedly yields an image having good rubfastness and high quality by controlling the permeability of paper by means of a surfactant and a penetrant. Also, Patent Document 3 discloses a coating material comprising a compound represented by the formula (1) described later as a coalescing agent.

CITATION LIST

Patent Literature

Patent Literature 1: International Publication No. WO 2008/105289
Patent Literature 2: Japanese Patent Laid-Open No. 2003-253167
Patent Literature 3: Japanese Patent Laid-Open No. 2006-182943

SUMMARY OF INVENTION

Technical Problem

An object of the present invention is to provide an ink composition that offers a recorded image having excellent rubfastness and having high quality without causing a mottling phenomenon, even when a recording material having the low ability to absorb ink is used in the recording, an inkjet recording method using the ink composition, and a colored article obtained by coloring with the ink composition.

Solution to Problem

The present inventors have conducted diligent studies to attain the object and consequently completed the present invention by finding that the object can be attained by an ink composition comprising at least a compound represented by the formula (1), a colorant, a dispersant, and a C4-C12 alkanediol.

Specifically, the present invention relates to the following 1) to 10):

1) An ink composition comprising a compound represented by the following formula (1), a colorant, a dispersant, and a C4-C12 alkanediol, wherein the content of the compound represented by the following formula (1) is 0.1 to 5% by mass based on the total mass of the ink composition:

[Formula 1]

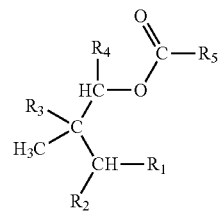

(1)

wherein $R_1$ represents a hydroxy group, an alkoxy group having a hydroxy group, an acyloxy group, or an arylcarbonyloxy group, $R_2$ represents a hydrogen atom or an alkyl group, $R_3$ represents a hydrogen atom or an alkyl group, $R_4$ represents a hydrogen atom, a hydroxy group, or an alkyl group, and $R_5$ represents an alkyl group.

2) The ink composition according to 1), wherein in the formula (1), $R_1$ is a hydroxy group or an alkoxy group having a hydroxy group.

3) The ink composition according to 1), wherein in the formula (1), $R_1$ is a hydroxy group.

4) The ink composition according to 1), wherein in the formula (1), $R_1$ is a hydroxy group, $R_2$ is an alkyl group, $R_3$ is an alkyl group, $R_4$ is a hydrogen atom or a hydroxy group, and $R_5$ is an alkyl group.

5) The ink composition according to 1), wherein in the formula (1), $R_1$ is a hydroxy group, $R_2$ is a branched alkyl group, $R_3$ is a linear alkyl group, $R_4$ is a hydrogen atom or a hydroxy group, and $R_5$ is a branched alkyl group.

6) The ink composition according to any one of 1) to 5), wherein the alkanediol is a C4-C8 alkanediol.

7) An inkjet recording method comprising performing recording by ejecting droplets of an ink composition according to any one of 1) to 6) in response to recording signals so that the droplets are attached to a recording material.

8) The inkjet recording method according to 7), wherein the recording material is an information transmission sheet.

9) A colored article obtained by coloring with an ink composition according to any one of 1) to 6).

10) An inkjet printer equipped with a container comprising an ink composition according to any one of 1) to 6).

Advantageous Effects of Invention

The present invention can provide an ink composition that offers a recorded image having excellent rubfastness and having high quality without causing a mottling phenomenon, even when a recording material having the low ability to absorb ink is used in the recording, an inkjet recording method using the ink composition, and a colored article obtained by coloring with the ink composition.

DESCRIPTION OF EMBODIMENTS

In the present specification, the term "C.I." means "color index". In the present specification, including Examples, etc., "%" and "part" are both described by mass unless otherwise specified.

In the formula (1), the alkoxy group having a hydroxy group, represented by $R_1$ is usually each group of hydroxy-C1-C6 alkoxy, preferably hydroxy-C1-C4 alkoxy, more preferably hydroxy-C2-C4 alkoxy. Examples of the alkoxy moiety thereof include linear, branched, or cyclic alkoxy. The alkoxy moiety is preferably linear or branched, more preferably linear. Specific examples thereof include: linear forms such as hydroxymethoxy, 2-hydroxyethoxy, 2-hydroxy-n-propoxy, 3-hydroxy-n-propoxy, 2-hydroxy-n-butoxy, 3-hydroxy-n-butoxy, 4-hydroxy-n-butoxy, 2-hydroxy-n-pentoxy, 3-hydroxy-n-pentoxy, 4-hydroxy-n-pentoxy, 5-hydroxy-n-pentoxy, 2-hydroxy-n-hexyloxy, 3-hydroxy-n-hexyloxy, 4-hydroxy-n-hexyloxy, 5-hydroxy-n-hexyloxy, and 6-hydroxy-n-hexyloxy; branched forms such as 2-hydroxyisopropoxy, 2-hydroxyisobutoxy, 3-hydroxyisobutoxy, 2-hydroxyisopentoxy, 3-hydroxyisopentoxy, 4-hydroxyisopentoxy, 2-hydroxyisohexyloxy, 3-hydroxyisohexyloxy, 4-hydroxyisohexyloxy, and 5-hydroxyisohexyloxy; and cyclic form such as 2-hydroxycyclopropoxy, 2-hydroxycyclobutoxy, 3-hydroxycyclobutoxy, 2-hydroxycyclopentoxy, 3-hydroxycyclopentoxy, 2-hydroxycyclohexyloxy, 3-hydroxycyclohexyloxy, and 4-hydroxycyclohexyloxy. Among them, 2-hydroxyethoxy is preferred.

The acyloxy group represented by $R_1$ is usually each group of linear, branched, or cyclic C1-C6 acyloxy, preferably C1-C5 acyloxy, more preferably C2-C5 acyloxy. Among them, linear or branched acyloxy is preferred, and linear acyloxy is more preferred. Also, an acyloxy group having another carbonyl group in addition to ester carbonyl of the acyloxy moiety is preferred. Specific examples thereof include: linear forms such as methylcarbonyloxy, ethylcarbonyloxy, n-propylcarbonyloxy, n-butylcarbonyloxy, and n-pentylcarbonyloxy; branched forms such as isopropylcarbonyloxy, isobutylcarbonyloxy, t-butylcarbonyloxy, isopentylcarbonyloxy, 1-ethylpropylcarbonyloxy, 1,1-dimethylpropylcarbonyloxy, and 2,2-dimethylpropylcarbonyloxy; cyclic forms such as cyclobutylcarbonyloxy and cyclopentylcarbonyloxy; and forms having another carbonyl group such as 1-oxoethylcarbonyloxy, 2-oxopropylcarbonyloxy, 2-oxobutylcarbonyloxy, 3-oxobutylcarbonyloxy, 2-oxopentylcarbonyloxy, 3-oxopentylcarbonyloxy, and 4-oxopentylcarbonyloxy. Among them, 1-oxoethylcarbonyloxy or 3-oxobutylcarbonyloxy is preferred.

The arylcarbonyloxy group represented by $R_1$ is usually C6-C12 arylcarbonyloxy. Specific examples thereof include phenylcarbonyloxy, naphthylcarbonyloxy, and biphenylcarbonyloxy. Among them, phenylcarbonyloxy is preferred.

Among those described above, $R_1$ is preferably a hydroxy group or an alkoxy group having a hydroxy group, more preferably a hydroxy group.

The alkyl group represented by each of $R_2$ to $R_5$ is usually C1-C6, preferably a C1-C4 linear, branched, or cyclic alkyl group. Specific examples thereof include: linear forms such as methyl, ethyl, n-propyl, n-butyl, n-pentyl, and n-hexyl; branched forms such as isopropyl, isobutyl, sec-butyl, t-butyl, isopentyl, t-pentyl, isohexyl, and t-hexyl; and cyclic forms such as cyclopropyl, cyclobutyl, cyclopentyl, and cyclohexyl.

Among them, $R_2$ is preferably a linear or branched form, more preferably branched form. Among those described above, a C3-C4 linear or branched alkyl group is preferred, n-propyl, isopropyl, or t-butyl is more preferred, and isopropyl is particularly preferred.

$R_3$ is preferably a linear form. Among those described above, methyl is particularly preferred.

$R_4$ is preferably a linear or branched form. Among those described above, a C3-C4 linear or branched alkyl group is preferred, and n-propyl, isopropyl, or t-butyl is more preferred.

$R_5$ is preferably a linear or branched form, more preferably a branched form. Among those described above, a C2-C4 linear or branched alkyl group is preferred, ethyl, n-propyl, isopropyl, or t-butyl is more preferred, and isopropyl is particularly preferred.

Among those described above, $R_1$ is preferably a hydroxy group or an alkoxy group having a hydroxy group, more preferably a hydroxy group.

$R_2$ is preferably an alkyl group, more preferably a branched alkyl group.

$R_3$ is preferably an alkyl group, more preferably a linear alkyl group.

$R_4$ is preferably a hydrogen atom or a hydroxy group.

$R_5$ is preferably a branched alkyl group.

Among those described above, a combination of the preferred ones is more preferred, and a combination of the more preferred ones is further preferred. The same holds true for a combination of the preferred and more preferred ones, a combination of the more preferred and further preferred ones, etc.

Examples of a commercially available product of the compound represented by the formula (1) include Texanol manufactured by Eastman Chemical Company.

Specific examples of the compound represented by the formula (1) are listed in Table 1 below. However, the present invention is not intended to be limited by these specific examples by any means. The abbreviations, etc., in Table 1 have the following meanings:

Ph: phenyl
i-Pr: isopropyl
n-Pr: normal propyl
t-Bu: tertiary butyl
Et: ethyl

TABLE 1

| Compound No. | $R_1$ | $R_2$ | $R_3$ | $R_4$ | $R_5$ |
|---|---|---|---|---|---|
| (1)-1 | OH | i-Pr | $CH_3$ | H | i-Pr |
| (1)-2 | OH | i-Pr | $CH_3$ | OH | i-Pr |
| (1)-3 | OH | H | $CH_3$ | i-Pr | i-Pr |
| (1)-4 | OH | H | H | t-Bu | i-Pr |
| (1)-5 | OH | n-Pr | $CH_3$ | H | n-Pr |
| (1)-6 | OH | H | $CH_3$ | n-Pr | n-Pr |
| (1)-7 | OH | i-Pr | $CH_3$ | H | t-Bu |
| (1)-8 | $OCH_2CH_2OH$ | i-Pr | $CH_3$ | H | i-Pr |
| (1)-9 | $OC(O)CH_2CH_2C(O)CH_3$ | i-Pr | $CH_3$ | H | i-Pr |
| (1)-10 | $OC(O)C(O)CH_3$ | i-Pr | $CH_3$ | H | i-Pr |
| (1)-11 | OC(O)Ph | i-Pr | $CH_3$ | H | i-Pr |
| (1)-12 | $OC(O)CH(CH_3)_2$ | i-Pr | $CH_3$ | H | i-Pr |
| (1)-13 | OH | t-Bu | $CH_3$ | H | i-Pr |
| (1)-14 | OH | t-Bu | $CH_3$ | H | Et |

The content of the compound represented by the formula (1) is usually 0.1% to 5%, preferably 1% to 5% based on the total mass of the ink composition. The ink composition comprising 0.1% or larger of this compound produces the effect of improving the mottling phenomenon, and the ink composition comprising 5% or smaller of this compound has favorable preservation stability, etc.

The ink composition may comprise only one type of compound represented by the formula (1), or two or more types of compounds represented by the formula (1) may be used in combination.

The colorant comprised in the ink composition is not particularly limited, and a pigment, a disperse dye, an oil-soluble dye, or the like can be used. The colorant is preferably a colorant insoluble or poorly soluble in water. In the present specification, the colorant insoluble or poorly soluble in water means a colorant having solubility of usually 3 g/liter or lower, preferably 2 g/liter or lower, more preferably 1 g/liter or lower, in water of 25° C.

The ink composition is an ink composition having the colorant in a dispersed state, i.e., a dispersed ink composition.

The pigment typically includes an inorganic pigment, an organic pigment, and extender pigment, etc. In the present invention, any of these pigments can be used. These pigments may be combined, and, for example, an extender pigment may be added into an organic pigment.

Examples of the inorganic pigment include: carbon black; and metal oxides, metal hydroxides, metal sulfides, ferrocyanides, and metal chlorides. Particularly, carbon black is preferred as a black inorganic pigment. Examples of the type of the carbon black include thermal black, acetylene black, oil furnace black, gas furnace black, lamp black, gas black, and channel black.

The carbon black is preferably furnace black, lamp black, acetylene black, channel black, or the like. Specific examples of the carbon black include: Raven 760 ULTRA, Raven 780 ULTRA, Raven 790 ULTRA, Raven 1060 ULTRA, Raven 1080 ULTRA, Raven 1170, Raven 1190 ULTRA II, Raven 1200, Raven 1250, Raven 1255, Raven 1500, Raven 2000, Raven 2500 ULTRA, Raven 3500, Raven 5000 ULTRA II, Raven 5250, Raven 5750, and Raven 7000 (all manufactured by Columbian Carbon Deutschland GmbH); Monarch 700, Monarch 800, Monarch 880, Monarch 900, Monarch 1000, Monarch 1100, Monarch 1300, Monarch 1400, Regal 1330R, Regal 1400R, Regal 1660R, and Mogul L (all manufactured by Cabot Corp.); Color Black FW1, Color Black FW2, Color Black FW2V, Color Black FW200, Color Black S150, Color Black S160, Color Black S170, Printex 35, Printex U, Printex V, Printex 140U, Printex 140V, Special Black 4, Special Black 4A, Special Black 5, and Special Black 6 (all manufactured by Degussa AG); and MA7, MA8, MA100, MA600, MCF-88, No. 25, No. 33, No. 40, No. 47, No. 52, No. 900, and No. 2300 (all manufactured by Mitsubishi Chemical Corp.).

Examples of the organic pigment include soluble azo pigments, insoluble azo pigments, insoluble diazo pigments, condensed azo pigments, phthalocyanine pigments, quinacridon pigments, isoindolinone pigments, dioxazine pigments, perylene pigments, perinone pigments, thioindigo pigments, anthraquinone pigments, and quinophthalone pigments.

Specific examples of the organic pigment include: yellow pigments such as C.I. Pigment Yellow 1, 2, 3, 12, 13, 14, 16, 17, 24, 55, 73, 74, 75, 83, 93, 94, 95, 97, 98, 108, 114, 128, 129, 138, 139, 150, 151, 154, 155, 180, 185, 193, 199, and 202; red pigments such as C.I. Pigment Red 5, 7, 12, 48, 48:1, 57, 88, 112, 122, 123, 146, 149, 166, 168, 177, 178, 179, 184, 185, 202, 206, 207, 254, 255, 257, 260, 264, and 272; blue pigments such as C.I. Pigment Blue 1, 2, 3, 15, 15:1, 15:2, 15:3, 15:4, 15:6, 16, 22, 25, 60, 66, and 80; violet pigments such as C.I. Pigment Violet 19, 23, 29, 37, 38, and 50; orange to brown pigments such as C.I. Pigment Orange 13, 16, 68, 69, 71, and 73; green pigments such as C.I. Pigment Green 7, 36, and 54; and black pigments such as C.I. Pigment Black 1.

Examples of the extender pigment include silica, calcium carbonate, talc, clay, barium sulfate, and white carbon. These extender pigments are not used each alone and are usually used in combination with an inorganic pigment or an organic pigment.

For example, a disperse dye known in the art such as an azobenzene or anthraquinone dye can be used as the disperse dye.

Preferred examples of the disperse dye include: yellow dyes such as C.I. Disperse Yellow 9, 23, 33, 42, 49, 54, 58, 60, 64, 66, 71, 76, 79, 83, 86, 90, 93, 99, 114, 116, 119, 122, 126, 149, 160, 163, 165, 180, 183, 186, 198, 200, 211, 224, 226, 227, 231, and 237; red dyes such as C.I. Disperse Red 60, 73, 88, 91, 92, 111, 127, 131, 143, 145, 146, 152, 153, 154, 167, 179, 191, 192, 206, 221, 258, and 283: orange dyes such as C.I. Disperse Orange 9, 25, 29, 30, 31, 32, 37, 38, 42, 44, 45, 53, 54, 55, 56, 61, 71, 73, 76, 80, 96, and 97; violet dyes such as C.I. Disperse Violet 25, 27, 28, 54, 57, 60, 73, 77, 79, and 79:1; and blue dyes such as C.I. Disperse Blue 27, 56, 60, 79:1, 87, 143, 165, 165:1, 165:2, 181, 185, 197, 202, 225, 257, 266, 267, 281, 341, 353, 354, 358, 364, 365, and 368.

A single pigment or dye can be used as the colorant. Alternatively, two or more types of colorants selected from these pigments and dyes may be used in combination for the purpose of, for example, adjusting the hue of an image to be recorded.

Also, a surface-treated pigment (also referred to as a self-dispersible pigment) having a dispersibility-imparting group chemically introduced to the surface of pigment particles can be used.

The content of the colorant is usually 1 to 30%, preferably 1 to 10%, more preferably 2 to 7% based on the total mass of the ink composition.

Examples of the dispersant include copolymers consisting of at least two monomers (preferably, at least one of them is a hydrophilic monomer) selected from the monomer group consisting of: styrene and derivatives thereof; vinylnaphthalene and derivatives thereof; aliphatic alcohol esters of α,β-ethylenic unsaturated carboxylic acids; acrylic acid and derivatives thereof; maleic acid and derivatives thereof;

itaconic acid and derivatives thereof; fumaric acid and derivatives thereof; vinyl acetate, vinyl alcohol, vinylpyrrolidone, acrylamide, and derivatives thereof; etc., for example, block copolymers, random copolymers, and graft copolymers, and/or salts thereof.

The dispersant may be synthesized or may be obtained as a commercially available product. Specific examples of the commercially available product preferably include Joncryl 61J, 67, 68, 450, 55, 555, 586, 678, 680, 682, 683, 690, and B-36, all manufactured by BASF SE.

Further examples thereof preferably include dispersants described in International Publication No. WO 2013/115071.

One type of dispersant may be used, or two or more types of dispersants may be used in combination.

The weight-average molecular weight of the dispersant is on the order of 10000 to 60000, preferably 12500 to 40000, more preferably 12500 to 30000. Its acid value is on the order of 80 to 300, preferably 90 to 275, more preferably 90 to 250.

The dispersant can be used in a state mixed with the colorant. Alternatively, the surface of the colorant may be coated with the dispersant, and a so-called microencapsulated pigment can be used.

The ink composition may comprise the colorant and the dispersant in a mixed state or may comprise the colorant and the dispersant in the form of the microencapsulated pigment. The latter case is preferred.

The amount of the dispersant used with respect to the colorant is 1 part of the colorant and usually 0.1 parts to 1 part, preferably 0.1 parts to 0.6 parts, more preferably 0.2 parts to 0.4 parts, of the dispersant. Too small or too large an amount of the dispersant used may cause problems such as reduction in the stability of the ink composition and deterioration in recorded image.

The alkanediol comprised in the ink composition is preferably a C4-C12 alkanediol, more preferably a C4-C8 alkanediol. The alkane in the alkanediol may be linear or branched and is preferably linear. The substitution position of the diol is not particularly limited. Preferably, one of the two hydroxy groups is located at position 1 of the alkane, and 1,2-alkanediol is preferred. Specific examples thereof include 1,2-butanediol, 1,3-butanediol, 1,4-butanediol, 1,2-pentanediol, 1,3-pentanediol, 1,4-pentanediol, 1,5-pentanediol, 1,2-hexanediol, 1,3-hexanediol, 1,4-hexanediol, 1,5-hexanediol, 1,6-hexanediol, 1,2-heptanediol, 1,3-heptanediol, 1,4-heptanediol, 1,5-heptanediol, 1,6-heptanediol, 1,7-heptanediol, 1,2-octanediol, 1,3-octanediol, 1,4-octanediol, 1,5-octanediol, 1,6-octanediol, 1,7-octanediol, 1,8-octanediol, 1,2-nonanediol, 1,2-decanediol, 1,2-undecanediol, and 1,2-dodecanediol. Among them, 1,2-butanediol, 1,2-hexanediol, or 1,2-octanediol is preferred.

The content of the C4-C12 alkanediol is usually 1 to 35%, preferably 1 to 20% based on the total mass of the ink composition. Also, the content of the C4-C12 alkanediol is usually 2 to 200 times the amount of the compound represented by the formula (1) by mass.

The ink composition can optionally comprise, for example, an additive for ink preparation such as a water-soluble organic solvent, an antiseptic, a mildew-proofing agent, a pH adjuster, a chelating reagent, a rust preventive, a water-soluble ultraviolet absorber, a water-soluble polymer compound, an antioxidant, a surfactant, a water-dispersible resin, or a wax agent. As for the type of each additive for ink preparation, one type may be used, or two or more types may be used in combination.

Examples of the water-soluble organic solvent include: C1-C6 alkanols such as methanol, ethanol, propanol, isopropanol, butanol, isobutanol, secondary butanol, tertiary butanol, and trimethylolpropane; carboxylic acid amides such as N,N-dimethylformamide and N,N-dimethylacetamide; lactams such as 2-pyrrolidone, N-methyl-2-pyrrolidone, and N-methylpyrrolidin-2-one; cyclic ureas such as 1,3-dimethylimidazolidin-2-one and 1,3-dimethylhexahydropyrimid-2-one; ketones or keto alcohols such as acetone, 2-methyl-2-hydroxypentan-4-one, and ethylene carbonate; cyclic ethers such as tetrahydrofuran and dioxane; mono-, oligo-, or polyalkylene glycols having C2-C6 alkylene units, or thioglycols, such as ethylene glycol, diethylene glycol, triethylene glycol, tetraethylene glycol, propylene glycol, dipropylene glycol, polyethylene glycols having a molecular weight of 400, 800, 1540 or larger, polypropylene glycol, thiodiglycol, and dithiodiglycol; polyols (triols) such as glycerin, diglycerin, and hexane-1,2,6-triol; C1-C4 alkyl ethers of polyhydric alcohols such as ethylene glycol monomethyl ether, ethylene glycol monoethyl ether, diethylene glycol monoethyl ether, diethylene glycol monobutyl ether (butyl carbitol), triethylene glycol monomethyl ether, triethylene glycol monoethyl ether, ethylene glycol monoallyl ether, ethylene glycol monoisopropyl ether, diethylene glycol monomethyl ether, propylene glycol monopropyl ether, and triethylene glycol monobutyl ether; and γ-butyrolactone and dimethyl sulfoxide.

Among them, monoalkylene glycol is preferred, and propylene glycol is more preferred. Also, isopropanol, 2-pyrrolidone, N-methyl-2-pyrrolidone, glycerin, ethylene glycol monoallyl ether, ethylene glycol monoisopropyl ether, diethylene glycol monomethyl ether, propylene glycol monopropyl ether, or the like is preferred.

Examples of the antiseptic include organic sulfur, organic nitrogen-sulfur, organic halogen, haloarylsulfone, iodopropargyl, haloalkylthio, nitrile, pyridine, 8-oxyquinoline, benzothiazole, isothiazoline, dithiol, pyridine oxide, nitropropane, organic tin, phenol, quaternary ammonium salt, triazine, thiazine, anilide, adamantane, dithiocarbamate, brominated indanone, benzyl bromoacetate, and inorganic salt compounds.

Specific examples of a commercially available product of the antiseptic include trade names PROXEL GXL(S) and PROXEL XL-2(S) manufactured by Arch Chemicals, Inc.

Specific examples of the mildew-proofing agent include sodium dehydroacetate, sodium benzoate, sodium pyridinethione 1-oxide, p-hydroxybenzoic acid ethyl ester, 1,2-benzisothiazolin-3-one, and salts thereof.

Any substance can be used as the pH adjuster as long as the substance has no adverse effect on the ink composition to be prepared and can control its pH within the range described below. Specific examples thereof include: alkanolamines such as diethanolamine, triethanolamine, and N-methyldiethanolamine; hydroxides of alkali metals such as lithium hydroxide, sodium hydroxide, and potassium hydroxide; ammonium hydroxide (ammonia water); carbonates of alkali metals such as lithium carbonate, sodium carbonate, sodium bicarbonate, and potassium carbonate; alkali metal salts of organic acids such as sodium silicate and potassium acetate; and inorganic bases such as disodium phosphate.

Specific examples of the chelating reagent include disodium ethylenediaminetetraacetate, sodium nitrilotriacetate, sodium hydroxyethylethylenediaminetriacetate, sodium diethylenetriaminepentaacetate, and sodium uracil diacetate.

Specific examples of the rust preventive include acidic sulfite, sodium thiosulfate, ammonium thioglycolate, diisopropyl ammonium nitrite, pentaerythritol tetranitrate, and dicyclohexyl ammonium nitrite.

Examples of the water-soluble ultraviolet absorber include sulfonated benzophenone compounds, benzotriazole compounds, salicylic acid compounds, cinnamic acid compounds, and triazine compounds.

Specific examples of the water-soluble polymer compound include polyethylene glycol, polyvinyl alcohol, cellulose derivatives, polyamine, and polyimine.

As examples of the antioxidant, for example, various organic and metal complex antifading agents can be used. Examples of the organic antifading agent include hydroquinones, alkoxyphenols, dialkoxyphenols, phenols, anilines, amines, indanes, chromanes, alkoxyanilines, and heterocyclic rings.

Examples of the surfactant include surfactants known in the art such as anionic, cationic, nonionic, amphoteric, silicone, and fluorine surfactants.

Examples of the anionic surfactant include alkyl sulfocarboxylate, α-olefin sulfonate, polyoxyethylene alkyl ether acetate, polyoxyethylene alkyl ether sulfate, N-acylamino acid or salts thereof, N-acyl methyl taurine salt, alkyl sulfate polyoxyalkyl ether sulfate, alkyl sulfate polyoxyethylene alkyl ether phosphate, rosin acid soap, castor oil sulfuric acid ester salt, lauryl alcohol sulfuric acid ester salt, alkylphenol-type phosphoric acid ester, alkyl-type phosphoric acid ester, alkylaryl sulfonate, diethyl sulfosuccinate, diethylhexyl sulfosuccinate, and dioctyl sulfosuccinate. Specific examples of the anionic surfactant that can be obtained as a commercially available product include Hitenol LA-10, LA-12, and LA-16, and Neo-Hitenol ECL-30S and ECL-45 (all manufactured by DKS Co., Ltd.).

Examples of the cationic surfactant include 2-vinylpyridine derivatives and poly-4-vinylpyridine derivatives.

Examples of the nonionic surfactant include: ethers such as polyoxyethylene nonyl phenyl ether, polyoxyethylene octyl phenyl ether, polyoxyethylene dodecyl phenyl ether, polyoxyethylene oleyl ether, polyoxyethylene lauryl ether, and polyoxyethylene alkyl ether; esters such as polyoxyethylene oleic acid ester, polyoxyethylene distearic acid ester, sorbitan laurate, sorbitan monostearate, sorbitan monooleate, sorbitan sesquioleate, polyoxyethylene monooleate, and polyoxyethylene stearate; acetylene glycols (alcohols) such as 2,4,7,9-tetramethyl-5-decyne-4,7-diol, 3,6-dimethyl-4-octyne-3,6-diol, 3,5-dimethyl-1-hexyn-3-ol; trade names Surfynol 104, 105PG50, 82, 420, 440, 465, and 485, and Olfine STG manufactured by Nissin Chemical Industry Co., Ltd.; and poly glycol ethers (e.g., Tergltol 15-S-7 manufactured by Sigma-Aldrich Inc.).

Examples of the amphoteric surfactant include lauryl dimethylaminoacetic acid betaine, 2-alkyl-N-carboxymethyl-N-hydroxyethyl imidazolinium betaine, coconut oil fatty acid amide propyldimethylaminoacetic acid betaine, polyoctyl polyaminoethyl glycine, and imidazoline derivatives.

Examples of the silicone surfactant include polyether-modified siloxane and polyether-modified polydimethylsiloxane. One example thereof includes Dinol 960 and Dinol 980 (manufactured by Air Products and Chemicals, Inc.), Silface SAG001, Silface SAG002, Silface SAG003, Silface SAG005, Silface SAG503A, Silface SAG008, Silface SAG009, and Silface SAG010 (manufactured by Nissin Chemical Industry Co., Ltd.), and BYK-345, BYK-347, BYK-348, BYK-349, and BYK-3455 (manufactured by BYK-Chemie GmbH).

Examples of the fluorine surfactant include perfluoroalkylsulfonic acid compounds, perfluoroalkylcarboxylic acid compounds, perfluoroalkylphosphoric acid ester compounds, perfluoroalkyl ethylene oxide adducts, and polyoxyalkylene ether polymer compounds having a perfluoroalkyl ether group in their side chains. One example thereof includes: Zonyl TBS, FSP, FSA, FSN-100, FSN, FSO-100, FSO, FS-300, Capstone FS-30, and FS-31 manufactured by DuPont; PF-151N and PF-154N manufactured by OMNOVA Solutions Inc.; F-114, F-410, F-444, EXP.TF-2066, EXP.TF-2148, EXP.TF-2149, F-430, F-477, F-552, F-553, F-554, F-555, F-556, F-557, F-558, F-559, F-561, F-562, R-40, R-41, RS-72-K, RS-75, RS-76-E, RS-76-NS, RS-77, EXP.TF-1540, and EXP.TF-1760 manufactured by DIC Corp.; BYK-3440 and BYK-3441 manufactured by BYK-Chemie GmbH.

Among these surfactants, preferred examples include nonionic, silicone, and fluorine surfactants. Among them, silicone and fluorine surfactants are preferred, and a silicone surfactant is more preferred in consideration of economic efficiency. Specific examples thereof include Surfynol 104PG50, Surfynol 420, Surfynol 440, Surfynol 465, Dinol 980, BYK-345, BYK-348, BYK-349, Capstone FS-30, and FS-31.

When the ink composition comprises surfactant(s), the total content of the surfactant is usually 0.1 to 3%, preferably 0.3 to 1%, with respect to the total mass of the ink composition. 0.1% or more of the surfactant easily produces its effects, and 3% or less of the surfactant offers the favorable dispersion stability of the pigment.

The water-dispersible resin preferably has the function of fixing the colorant in the ink composition to a recording material by film formation at normal temperature. Examples of the resin used in the water-dispersible resin include, but are not particularly limited to, urethane resins, polyester resins, acrylic resins, vinyl acetate resins, vinyl chloride resins, acrylic styrene resins, and acrylic silicone resins.

The water-dispersible resin can be used, for example, in the state of a resin emulsion in which the resin is dispersed in water as a continuous phase.

Specific examples of a commercially available product of the resin emulsion include: Superflex 126, 150, 170, 210, 420, 470, 820, 830, and 890 (urethane resin emulsions; manufactured by DKS Co., Ltd.); Hydran HW-350, HW-178, HW-163, HW-171, AP-20, AP-30, WLS-201, and WLS-210 (urethane resin emulsions; manufactured by DIC Corp.); 0569, 0850Z, and 2108 (styrene-butadiene resin emulsions; manufactured by JSR Corp.); and AE980, AE981A, AE982, AE986B, and AE104 (acrylic resin emulsions; manufactured by Emulsion Technology Co., Ltd.).

The wax agent preferably has the function of fixing the colorant to a recording material, just as the water-dispersible resin has. The wax agent is preferably a wax emulsion, more preferably an aqueous wax emulsion. Natural wax such as paraffin wax or microcrystalline wax, or chemically synthesized wax such as polyethylene, polypropylene, or Fischer-Tropsch wax can be used as the wax. The particle size of the wax emulsion is preferably 5 μm or smaller, more preferably 1 μm or smaller, for preventing an inkjet head from being clogged.

Examples of a commercially available product of the wax emulsion include: CERAFLOUR 925, CERAFLOUR 929, CERAFLOUR 950, CERAFLOUR 991, AQUACER 498, AQUACER 507, AQUACER 515, AQUACER 526, AQUACER 531, AQUACER 537, AQUACER 539, AQUACER 552, AQUACER 1547, AQUAMAT 208, AQUAMAT 263, AQUAMAT 272, and MINERPOL 221 manufactured by BYK-Chemie GmbH; Mitsui Hi-Wax NL100, Mitsui Hi-Wax NL200, Mitsui Hi-Wax NL500, Mitsui Hi-Wax 4202E, Mitsui Hi-Wax 1105A, Mitsui Hi-Wax 2203A, Mitsui Hi-Wax NP055, and Mitsui Hi-Wax NP505 manufactured by Mitsui Chemicals, Inc.; and KUE-100 and KUE-11 manufactured by Sanyo Chemical Industries, Ltd.

Examples of a method for preparing the ink composition include a method which involves, for example, mixing the colorant and the dispersant by stirring in water by use of a method known in the art, etc., using a sand mill (also called bead mill), a roll mill, a ball mill, a paint shaker, an ultrasonic dispersing machine, a microfluidizer, or the like, to obtain a dispersion of the colorant, then adding the additive for ink preparation and the like, if necessary, and mixing these components by a method known in the art, etc., using stirring, a homogenizer, or the like to prepare the ink composition. For the preparation of the ink composition, the order in which these components are added is not particularly limited.

The dispersion or the ink composition may be subjected to microfiltration, if necessary, using a membrane filter, a glass filter paper, or the like to remove impurities. When the ink composition is used in inkjet recording, it is preferred to perform microfiltration. The pore size of the filter for the microfiltration is usually 0.5 µm to 20 µm, preferably 0.5 µm to 10 µm. The pore size is preferably 0.5 µm to 20 µm for the microfiltration of the dispersion and is preferably 0.5 µm to 10 µm for the microfiltration of the ink composition.

The pH of the ink composition is preferably pH 5 to 11, more preferably pH 7 to 10, for the purpose of improving preservation stability. The surface tension of the ink composition is preferably 10 to 50 mN/m, more preferably 20 to 40 mN/m. The viscosity of the ink composition is preferably 30 mPa·s or smaller, more preferably 20 mPa·s or smaller.

When the ink composition is used as ink for inkjet recording, it is preferred to use an ink composition having a low content of inorganic impurities such as a chloride of a metal cation (e.g., sodium chloride) and a sulfate of a metal cation (e.g., sodium sulfate) comprised in the ink composition. In general, the inorganic impurities are often comprised in a colorant obtained as a commercially available product. As a guideline, the content of the inorganic impurities is approximately 1% by mass or less with respect to the total mass of the colorant, and the lower limit can be equal to or lower than the detection limit of analysis equipment, i.e., 0%. Examples of a method for obtaining a colorant having a small content of inorganic impurities include desalting treatments such as: a method using a reverse osmosis membrane; a method which involves suspending and stirring a solid colorant in a mixed solvent of a C1-C4 alcohol such as methanol and water, and separating a colored article by filtration, followed by drying; and a method which involves exchange-adsorbing inorganic impurities using an ion-exchange resin.

The ink composition can be used in various fields of recording and printing. The ink composition is suitable for, for example, aqueous ink for writing, aqueous printing ink, information recording ink, and textile printing. Particularly, the ink composition is preferably used in inkjet recording and suitably used in an inkjet recording method mentioned later.

The inkjet recording method of the present invention is a method comprising performing recording by ejecting droplets of the ink composition in response to recording signals so that the droplets are attached to a recording material. An ink nozzle, etc., for use in the recording is not particularly limited and can be appropriately selected according to the purpose.

The inkjet recording method may be based on any scheme known in the art. Examples thereof include: a charge control scheme which ejects ink through the use of electrostatic attractive force; a drop-on-demand scheme (also called pressure pulse scheme) which utilizes the oscillating pressure of a Piezo element; an acoustic inkjet scheme which irradiates ink with acoustic beams converted from electric signals and ejects the ink through the use of the radiation pressure thereof; and a thermal inkjet scheme, i.e., Bubblejet® scheme, which forms air bubbles by the heating of ink and utilizes the resulting pressure.

The inkjet recording method also includes: a scheme which ejects a large number of droplets with a small volume of ink having a small content of a colorant, called Photoink; a scheme which improves image quality using a plurality of inks differing in the content of a colorant with substantially the same hue; and a scheme which improves the fixability of a colorant to a recording material by the combined use of clear colorless ink and ink comprising a colorant.

The colored article means a substance colored with the ink composition. Preferred examples thereof include a recording material colored by an inkjet recording method using an inkjet printer. The recording material is not particularly limited and is preferably an information transmission sheet, particularly preferably a non-absorbing or poorly absorbing recording material. Specific examples thereof include coated paper, which includes, for example lightweight coated paper, art paper, coat paper, matt coated paper, and cast-coated paper.

The coated paper is paper which has been surface-coated with a coating material to enhance the sense of beauty or smoothness. Examples of the coating material include mixtures of various clays such as talc, pyrophyllite, and kaolin, titanium oxide, magnesium carbonate, or calcium carbonate with starch and/or polyvinyl alcohol, etc.

The lightweight coated paper refers to recording paper whose amount of the coating material applied is 12 g/m$^2$ or smaller. The art paper is high-quality recording paper (high-quality paper, paper with a chemical pulp use rate of 100%) which has been coated with approximately 40 g/m$^2$ of the coating material. The coat paper or the matt coated paper refers to recording paper which has been coated with approximately 20 to 40 g/m$^2$ of the coating material. The cast-coated paper refers to recording paper finished by applying pressure to the surface of art paper or coat paper using a machine called cast drum to further enhance gloss or recording effects.

The effects obtained by the present invention are very preferably exerted when such a non-absorbing or poorly absorbing recording material is used.

Examples of the recording material include: plain paper and media for use in gravure printing, offset printing or the like, which have no ink absorbing layer; inkjet exclusive paper, inkjet exclusive films, gloss paper, and gloss films, which have an ink absorbing layer; fiber and cloth (cellulose, nylon, wool, etc.); leather; and base materials for color filters. In this context, some plain papers having no ink absorbing layer have low ink absorbing properties, just as the non-absorbing or poorly absorbing recording material has. The effects obtained by the present invention are also very preferably exerted when such plain paper is used.

When the recording material such as an information transmission sheet is subjected to recording by the inkjet recording method, a container comprising for example, the above ink composition is set at a predetermined position in an inkjet printer, so that recording can be made on the recording material by the recording method.

The inkjet recording method can use the ink composition of the present invention, if necessary, in combination with respective color ink compositions of green, blue (or violet), and red (or orange), etc.

The respective color ink compositions are injected into their respective containers, and these containers are mounted at predetermined positions in the inkjet printer, just as the container comprising the ink composition is, so that they can be used for inkjet recording.

Use of the ink composition of the present invention can yield a recorded image having excellent rubfastness and having high quality without causing a mottling phenomenon even if not only inkjet exclusive paper or general-purpose plain paper but a non-absorbing or poorly absorbing recording material is used. Also, use of the ink composition of the present invention yields an image having a high roundness of ink dots on media and having smoothness without impairing gloss. In addition, use of the ink composition of the present invention can yield a recorded image excellent in various toughness properties such as water resistance, light resistance, heat resistance, and resistance to oxidation gas (e.g., ozone gas).

EXAMPLES

Hereinafter, the present invention will be specifically described with reference to Examples.

However, the present invention is not intended to be limited by Examples below.

Example 1

Preparation of Dispersion 1

The block copolymer described in Synthesis Example 3 of International Publication No. WO 2013/115071 was prepared, and 6 parts of the obtained polymer dispersant were dissolved in 30 parts of 2-butanone to prepare a uniform solution. To this solution, a solution comprising 0.44 g of sodium hydroxide dissolved in 41 parts of ion-exchanged water was added, and the mixture was stirred for 1 hour to prepare an emulsion comprising the polymer dispersant dissolved therein. 20 parts of C.I. Pigment Blue 15:3 (Cyanine Blue A220J manufactured by Dainichiseika Color & Chemicals Mfg. Co., Ltd.) were added thereto and dispersed in a sand grinder for 15 hours under conditions of 1500 rpm. To the obtained liquid, 100 parts of ion-exchanged water were added dropwise, and the mixture was filtered for the removal of the beads for dispersion. Then, 2-butanone and water were distilled off under reduced pressure using an evaporator to obtain a cyan dispersion having a pigment solid content of 11.9%. The solid content in the aqueous solution was measured using MS-70 manufactured by A&D Co., Ltd., and determined by the dry weight method. The obtained colored dispersion was designated as "dispersion 1".

Example 2

Preparation of Dispersion 2

11.3 parts of Joncryl 68 (MW: 13000) and 6 parts of triethanolamine were dissolved in 95.2 parts of ion-exchanged water, and the solution was stirred for 1 hour. To the obtained solution, 37.5 parts of C.I. Pigment Blue 15:3 (Cyanine Blue A220J manufactured by Dainichiseika Color & Chemicals Mfg. Co., Ltd.) were added and dispersed in a sand grinder for 20 hours under conditions of 1500 rpm. To the obtained dispersion, 150 parts of ion-exchanged water were added dropwise, and this liquid was then filtered for the removal of the beads for dispersion to obtain a dispersion having a solid content of 19.2%. The obtained dispersion was designated as "dispersion 2".

Examples 3 to 10

Preparation of Ink

The components of each Example described in Table 2 below were added and mixed by stirring. Then, impurities were filtered off through a membrane filter having a pore size of 3 μm to obtain ink compositions for evaluation tests. The obtained ink compositions were used as the respective ink compositions of Examples.

In Table 2, the numeric value of each component means "part". The term "balance" means that the total amount of the ink composition was adjusted to 100 parts by the addition of pure water.

The abbreviations, etc., in Table 2 below have the following meanings:
PG: propylene glycol
2-Py: 2-pyrrolidone
BYK-349: silicone surfactant, BYK-349
SF465: nonionic surfactant, Surfynol 465
FS-31: fluorine surfactant, Capstone FS-31
1,2-HD: 1,2-hexanediol
1,2-BD: 1,2-butanediol
1,2-OD: 1,2-octanediol
EG: ethylene glycol

TABLE 2

| Component | Example | | | | | | | | Comparative Example | | | | | |
| --- | --- | --- | --- | --- | --- | --- | --- | --- | --- | --- | --- | --- | --- | --- |
| | 3 | 4 | 5 | 6 | 7 | 8 | 9 | 10 | 1 | 2 | 3 | 4 | 5 | 6 |
| Dispersion 1 | 42 | 42 | — | 42 | 42 | 42 | 42 | 42 | 42 | 42 | — | 42 | 42 | 42 |
| Dispersion 2 | — | — | 26 | — | — | — | — | — | — | — | 26 | — | — | — |
| PG | 20 | 16 | 20 | 20 | 20 | 20 | 20 | 20 | 30 | 20 | 30 | 30.5 | 20 | 20 |
| 2-Py | 10 | 10 | 10 | 10 | 10 | 10 | 10 | 10 | 10 | 10 | 10 | 10 | 10 | 10 |
| BYK-349 | 0.5 | 0.5 | 0.5 | — | 0.25 | — | 0.5 | 0.5 | 0.5 | 0.5 | 0.5 | — | — | 0.5 |
| SF465 | — | — | — | — | 0.25 | — | — | — | — | — | — | — | — | — |
| FS-31 | — | — | — | — | — | 0.5 | — | — | — | — | — | — | — | — |
| Texanol | 1 | 5 | 1 | 1 | 1 | 1 | 1 | 1 | 1 | — | 1 | 1 | — | 1 |
| 1,2-HD | 10 | 10 | 10 | 10.5 | 10 | 10 | — | — | — | 11 | — | — | 11.5 | — |
| 1,2-BD | — | — | — | — | — | — | 10 | — | — | — | — | — | — | — |

TABLE 2-continued

| Component | Example | | | | | | | | Comparative Example | | | | | |
|---|---|---|---|---|---|---|---|---|---|---|---|---|---|---|
| | 3 | 4 | 5 | 6 | 7 | 8 | 9 | 10 | 1 | 2 | 3 | 4 | 5 | 6 |
| 1,2-OD | — | — | — | — | — | — | — | 10 | — | — | — | — | — | — |
| EG | — | — | — | — | — | — | — | — | — | — | — | — | — | 10 |
| Ion-exchanged water | Balance | | | | | | | | Balance | | | | | |
| Total | 100 | 100 | 100 | 100 | 100 | 100 | 100 | 100 | 100 | 100 | 100 | 100 | 100 | 100 |

Comparative Examples 1 to 6

Preparation of Ink for Comparison

The respective ink compositions for comparison of Comparative Examples 1 to 6 were prepared in the same way as in Examples 3 to 10 except that the components of each Example described in Table 2 above were used.

[(A) Inkjet Recording]

The respective ink compositions of Examples and Comparative Examples were each used in inkjet recording on Pearl Coat N (manufactured by Mitsubishi Paper Mills Ltd.: 127.9 g/m$^2$) as a recording material using an inkjet printer manufactured by Seiko Epson Corp. (trade name: PX205) to obtain colored articles. The recording on the recording material was performed with 100% Duty image for all of the samples.

[(B) Mottling Test]

Each colored article obtained in the paragraph [(A) inkjet recording] was used as a test piece. The mottling status of each test piece was visually observed. The evaluation was conducted on the basis of the following 3 criteria (A to C). The evaluation results are shown in Table 3 below.

A: The mottling phenomenon was suppressed, and the image was free from practical problems.

B: Minor color variations ascribable to the mottling phenomenon were confirmed on the image and might become practical problems.

C: The mottling phenomenon occurred, and uneven significant color variations were confirmed on the image, which was thus unsuitable for practical use.

[(C) Rubfastness Test]

Each colored article obtained in the paragraph [(A) Inkjet recording] was dried at 90° C. for 2 minutes and used as a test piece.

The recorded surface of each test piece was overlaid with the unrecorded blank surface of Pearl Coat N. A load of 500 g was shuttled 20 times on the surface of this two-ply paper. Then, Pearl Coat N was detached from each test piece. The print densities of the test piece before rubbing and the test piece after rubbing thus obtained were measured using a densitometer manufactured by X-Rite Inc. (trade name: Spectro Eye). The observation light source used was D50, and the observation field of view was set to 2°. The density measurement was conducted under conditions of ANSI A to measure the reflected density Dc value of the recorded image. The residual rate (%) of the colorant after rubbing was calculated as an index for rubfastness according to the following expression, and the results are shown in Table 3 below.

Residual rate (%)=(Print density after rubbing)/(Print density before rubbing)×100.

TABLE 3

| Evaluation results | Example | | | | | | | | Comparative Example | | | | | |
|---|---|---|---|---|---|---|---|---|---|---|---|---|---|---|
| | 3 | 4 | 5 | 6 | 7 | 8 | 9 | 10 | 1 | 2 | 3 | 4 | 5 | 6 |
| Mottling | A | A | A | A | A | A | A | A | B | A | C | C | C | C |
| Rubfastness | 97 | 99 | 95 | 96 | 95 | 98 | 97 | 97 | 81 | 74 | 91 | 92 | 93 | 89 |

As is evident from the results described above, the ink composition of each Example was confirmed to be an ink composition that offers a recorded image having excellent rubfastness and having high quality without causing a mottling phenomenon, even when a recording material having the low ability to absorb ink is used in the recording.

Examples 11 to 17

Preparation of Ink

The components of each Example described in Table 4 below were added and mixed by stirring. Then, impurities were filtered off through a membrane filter having a pore size of 3 μm to obtain ink compositions for evaluation tests. The obtained ink compositions were used as the respective ink compositions of Examples.

In Table 4, the numeric value of each component means "part". The term "balance" means that the total amount of the ink composition was adjusted to 100 parts by the addition of pure water.

The abbreviations, etc., in Table 4 below have the same meanings as those of the abbreviations, etc., in Table 2 above.

TABLE 4

| Component | Example | | | | | | |
|---|---|---|---|---|---|---|---|
| | 11 | 12 | 13 | 14 | 15 | 16 | 17 |
| Dispersion 1 | 42 | 42 | 42 | 42 | 42 | 42 | 42 |
| PG | 20 | 20 | 20 | 10 | 10 | 10 | 20 |
| 2-Py | 10 | 10 | 10 | 10 | 10 | 10 | 10 |
| BYK-349 | 0.5 | 0.5 | 0.5 | 0.5 | 0.5 | 0.5 | 0.5 |
| Texanol | 0.1 | 0.5 | 1.5 | 1 | 0.1 | 5 | 0.1 |
| 1,2-HD | 10 | 1 | 3 | 20 | 20 | 20 | 1 |
| Ion-exchanged water | Balance | | | | | | |
| Total | 100 | 100 | 100 | 100 | 100 | 100 | 100 |

Each of the ink compositions of Examples 11 to 17 obtained as described above was used to carry out the procedures of [(A) Inkjet recording], [(B) Mottling test], and [(C) Rubfastness test]. The results are shown in Table 5 below.

TABLE 5

| Evaluation results | Example | | | | | | |
|---|---|---|---|---|---|---|---|
|  | 11 | 12 | 13 | 14 | 15 | 16 | 17 |
| Mottling | A | A | A | A | A | A | A |
| Rubfastness | 96 | 96 | 97 | 96 | 96 | 97 | 96 |

As is evident from the results described above, the ink composition of each Example was confirmed to be an ink composition that offers a recorded image having excellent rubfastness and having high quality without causing a mottling phenomenon, even when a recording material having the low ability to absorb ink is used in the recording.

INDUSTRIAL APPLICABILITY

The ink composition of the present invention can offer a recorded image having excellent rubfastness and having high quality without causing a mottling phenomenon, even when a recording material having the low ability to absorb ink is used in the recording. Therefore, the ink composition of the present invention is very useful as ink for various recording techniques, particularly, ink for inkjet recording.

The invention claimed is:

1. An ink composition comprising a compound represented by the following formula (1), a colorant, a dispersant, and a C4-C12 alkanediol,
wherein the content of the compound represented by the following formula (1) is 0.1 to 5% by mass based on the total mass of the ink composition:

[Formula 1]

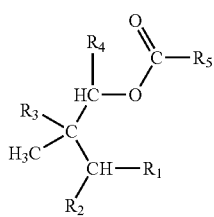

(1)

wherein the content of the colorant is 2 to 7% by mass based on the total mass of the ink composition,
wherein the content of the dispersant is 0.1 to 0.6 parts by mass relative to 1 part by mass of the colorant,
wherein the content of the C4-C12 alkanediol is 1 to 20% by mass based on the total mass of the ink composition,
wherein the dispersant is selected from the group consisting of a styrene-(meth)acrylic acid copolymer and a polymer composed of benzyl methacrylate, butyl methacrylate, and methacrylic acid,
wherein $R_1$ represents a hydroxy group, $R_2$ represents an isopropyl group, $R_3$ represents a methyl group, $R_4$ represents a hydrogen atom, and $R_5$ represents an isopropyl group.

2. The ink composition according to claim 1, wherein the alkanediol is a C4-C8 alkanediol.

3. An inkjet recording method comprising performing recording by ejecting droplets of the ink composition according to claim 1 in response to recording signals so that the droplets are attached to a recording material.

4. The inkjet recording method according to claim 3, wherein the recording material is an information transmission sheet.

5. A colored article obtained by coloring with the ink composition according to claim 1.

6. An inkjet printer equipped with a container comprising the ink composition according to claim 1.

7. The ink composition according to claim 1, further comprising a surfactant selected from the group consisting of a nonionic surfactant, a silicone surfactant, and a fluorine surfactant.

8. The ink composition according to claim 7, wherein the content of the surfactant is more than 0% and less than or equal to 0.5% by mass relative to the total mass of the ink composition.

9. The ink composition according to claim 8, further comprising propylene glycol, wherein the content of the propylene glycol is 16 to 20% by mass relative to the total mass of the ink composition.

10. The ink composition according to claim 9, further comprising 2-pyrrolidone.

* * * * *